Aug. 8, 1933.  L. C. CONNER  1,921,661
HAND TRUCK
Filed April 16, 1932
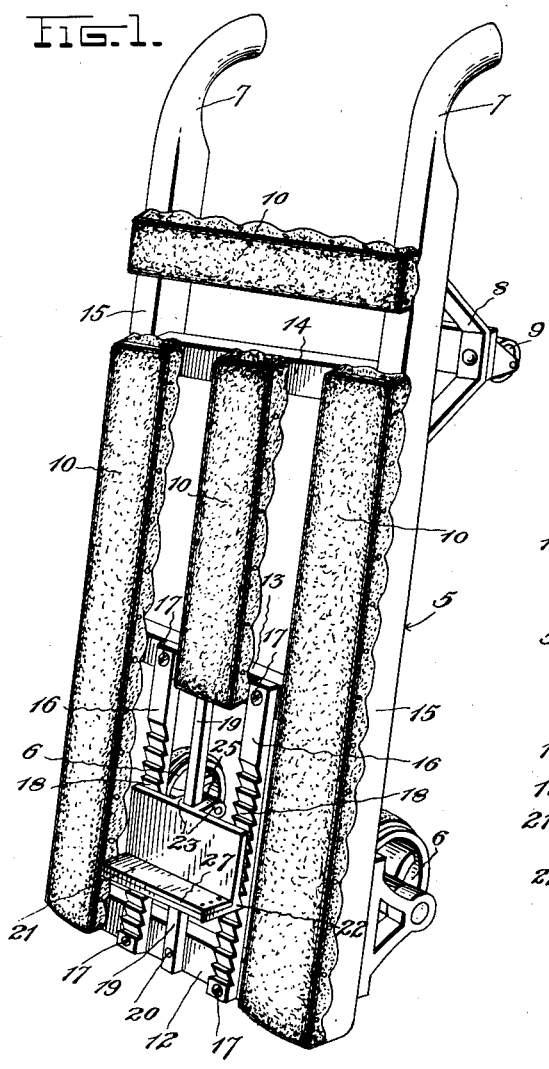
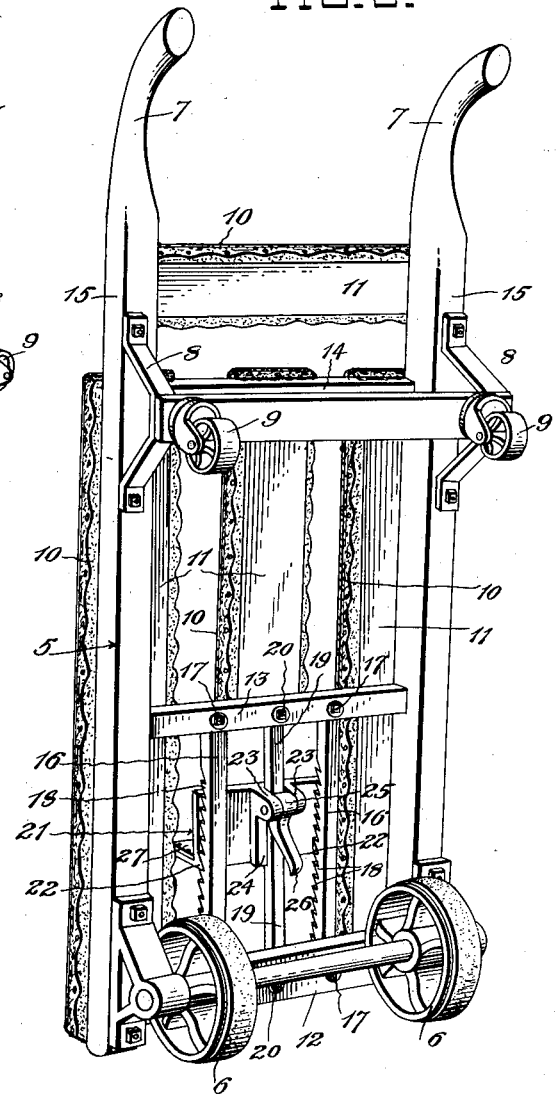
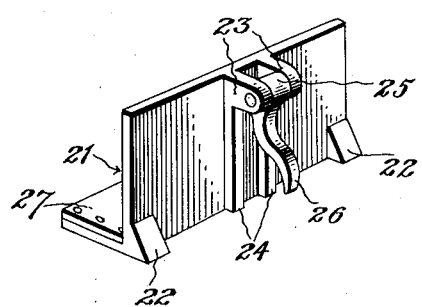
Inventor
L. C. Conner
By H. B. Willson &co
Attorneys.
Witness
C. S. Hunt.

Patented Aug. 8, 1933

1,921,661

UNITED STATES PATENT OFFICE 1,921,661

HAND TRUCK

Leland C. Conner, Orangeville, Pa.

Application April 16, 1932. Serial No. 605,752

2 Claims. (Cl. 280—57)

The invention relates to improvements in hand trucks of the type designed primarily for handling stoves, heavy articles of furniture, domestic refrigerators and the like. Such trucks are commonly provided with a vertically adjustable support for the load, and my invention aims primarily to improve upon the means for adjustably mounting this load support, so that adjustments may be more quickly and easily made.

With the foregoing in view, the invention resides in the novel subject matter hereinafter described and claimed, description being accomplished by reference to the accompanying drawing.

Fig. 1 is a perspective view showing the front of the truck.

Fig. 2 is a rear perspective view.

Fig. 3 is a perspective view of the adjustable load support and part of the means for holding it in adjusted position.

The truck frame 5 is equipped with wheels 6 and handles 7, and with legs 8 having casters 9. At least the wheels 6, and the casters 9 also if desired, are preferably rubber-tired to prevent injuring the floors of dwellings and the like in which the truck is used, and to prevent any part of the truck from injuring the finish of any furniture, refrigerator, etc., being carried thereby, the truck frame is provided with appropriately arranged pads 10 which are preferably secured upon boards 11.

In the present showing, the frame 5 includes a lower transverse bar 12, another transverse bar 13 spaced above said bar 12, and still another transverse bar 14 spaced above the bar 13, all of these bars 12, 13 and 14 being secured to the side bars 15 of the frame. Two of the pads 10 extend along the side bars 15 and are secured at their ends to the bars 12 and 14, another of the pads 10 is secured at its ends to the bars 13 and 14, and the remaining pad 10 and its carrying board 11, extend transversely of the others, being secured to said side bars 15.

Two longitudinal metal bars 16 are suitably secured at their ends to the bars 12 and 13, bolts 17 being shown for securing said bars 16 to said bars 12 and 13. The front sides of the bars 16 are provided with teeth 18 which are preferably of ratchet-like form. Disposed centrally between the bars 16, is a third longitudinal bar 19 whose ends are secured at 20 to the bars 12 and 13, said bar 19 being plain on all sides.

A load-support 21, preferably of the right angular shape shown, lies against the toothed front sides of the bars 16 and against the front side of the intermediate bar 19, the rear side of said load-support being provided with teeth 22 engageable with any of the teeth 18. The rear side of the load-support 21 is provided with guide means slidably engaging the bar 19, and associated with this guide means, is provision for engaging said bar 19 to hold said load-support normally against forward shifting, thereby holding its teeth 22 in engagement with the teeth 18. The guide means and the holding means are preferably of the construction shown.

Two lugs 23 are integral with the load-support 21 and project rearwardly therefrom, said lugs straddling the bar 19 and projecting rearwardly beyond the latter. The rear side of the load-support is also by preference provided with rearwardly projecting ribs 24 which slidably engage opposite sides of the bar 19, and the upper ends of these ribs may well be joined integrally to the lugs 23. A cam 25 is pivotally mounted between the rear ends of the lugs 23, and a hand lever 26 is integral with said cam. When this hand lever is forced downwardly, it forces the cam 25 into contact with the bar 19 thus securely holding the load support 21 against forward shifting and thereby holding the teeth 22 of said load-support in engagement with the teeth 18 of the bars 16. When the lever 26 is pulled upwardly however, it releases the cam 25, allowing the load-support 21 to shift forwardly the required amount to free the teeth 22 from the teeth 18, whereupon vertical movement of said lever 26 will vertically move the load-support 21 until the latter is at the desired elevation. Then, by simply forcing the hand lever 26 again downwardly securing of the load-support in its adjusted position will be effected.

It will be seen from the foregoing that novel and advantageous provision has been made for quickly and easily adjusting the load-support 21 to the most advantageous position for use. It will also be seen that the provision for holding said load-support adjusted is of exceptionally sturdy construction and will therefore be long-lived, without danger of injury.

Preferably, the forwardly projecting flange of the load-support 21, is provided on its upper side with a pad 27 of rubber or the like to prevent injury to articles being moved upon the truck, and to overcome slipping of such articles. If desired, to further prevent slipping, suitable straps (not shown) may be employed for tightly strapping the article to the truck frame.

Excellent results have been obtained from the construction shown and such construction is therefore preferably followed. However, within the scope of the invention as claimed, numerous variations may be made.

I claim:—

1. A hand truck comprising a wheel-and-handle-equipped frame, two laterally spaced longitudinal bars secured to said frame, the front sides of said longitudinal bars being provided with teeth, a load-support lying against the toothed front sides of said longitudinal bars and having teeth engageable with any of the aforesaid teeth, a third longitudinal bar secured to said frame between said two longitudinal bars, said third bar being disposed behind said load-support, guide means on said load-support slidably engaging said third longitudinal bar, and means carried by said guide means and engaging the rear side of said third bar to normally hold said load-support against forward movement, thereby holding the teeth of said load-support engaged with those of said two longitudinal bars.

2. A hand truck comprising a wheel-and-handle-equipped frame, two laterally spaced longitudinal bars secured to said frame, the front sides of said longitudinal bars being provided with teeth, a load-support lying against the toothed front sides of said longitudinal bars and having teeth engageable with any of the aforesaid teeth, a third longitudinal bar secured to said frame between said two longitudinal bars, said third bar being disposed behind said load-support, two lugs on said load-support straddling and projecting rearwardly beyond said third bar, a cam pivotally mounted between the rear ends of said lugs, and a lever integral with said cam for forcing the latter against said third bar to hold the load-support against forward movement thereby holding the teeth of said load-support engaged with those of said two bars.

LELAND C. CONNER.